US010185191B2

(12) United States Patent
Li et al.

(10) Patent No.: US 10,185,191 B2
(45) Date of Patent: Jan. 22, 2019

(54) PANEL CARRIER AND METHOD FOR ATTACHING A LIQUID-CRYSTAL-ON-SILICON PANEL THERETO

(71) Applicant: OmniVision Technologies, Inc., Santa Clara, CA (US)

(72) Inventors: En-Chi Li, Hsinchu (TW); Chi-Chih Huang, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/226,731

(22) Filed: Aug. 2, 2016

(65) Prior Publication Data

US 2018/0039126 A1    Feb. 8, 2018

(51) Int. Cl.
   G02F 1/1362    (2006.01)
   G02F 1/1345    (2006.01)

(52) U.S. Cl.
   CPC .... G02F 1/136277 (2013.01); G02F 1/13452 (2013.01); *G02F 2001/136281* (2013.01)

(58) Field of Classification Search
   CPC .............................................. G02F 1/133308
   See application file for complete search history.

(56) References Cited

U.S. PATENT DOCUMENTS

| | | | |
|---|---|---|---|
| 4,942,076 | A | 7/1990 | Panicker et al. |
| 6,120,708 | A | 9/2000 | Ohshita et al. |
| 6,356,334 | B1 | 3/2002 | Matthew et al. |
| 6,501,525 | B2 | 12/2002 | Huang et al. |
| 6,897,933 | B2 | 5/2005 | Hoshina |
| 7,786,747 | B2 | 8/2010 | Shih et al. |
| 7,808,573 | B2 | 10/2010 | Chen et al. |
| 8,339,563 | B2 | 12/2012 | Huang |
| 8,680,572 | B2 | 3/2014 | O'Connor et al. |

(Continued)

FOREIGN PATENT DOCUMENTS

JP    2012013975 A  *  1/2012
WO    017747 A2    10/2001

OTHER PUBLICATIONS

Steen, "Design of LCOS Microdisplay Backplanes for Projection Applications," ISBN 90-8578-062-4, Universiteit Gent, 2005-2006.
Underwood, "A Review of Microdisplay Technologies," the University of Edinburgh, A Keynote Paper presented at the Conference Entitled SID@EID, London, Nov. 21-23, 2000.
Goldstein, et al., "Packaging of Liquid Crystal on Silicon Microdisplays," website http://electroiq.com/blog/2001/05/packaging-of-liquid-crystal-on-silicon-microdisplays/, 2001.

(Continued)

Primary Examiner — Edmond Lau
(74) Attorney, Agent, or Firm — Lathrop Gage LLP

(57) ABSTRACT

A panel carrier includes a substrate, a die-attach region, a short sidewall, and a conductor. The die-attach region is on a top substrate surface of the substrate for supporting the LCoS panel. The short sidewall is on a first side of the die-attach region and has a top sidewall surface at a first height above the top substrate surface exceeding 0.4 millimeters and an aperture spanning the top sidewall surface and the top substrate surface. The conductor at least partially fills the aperture for electrically connecting to the conductive layer. A method for mechanically and electrically connecting a LCoS panel to a panel carrier having a short sidewall includes electrically connecting a transparent conductive layer of the LCoS panel to a conductive material, within the short sidewall, with a conductive adhesive having a thickness, between the transparent conductive layer and the short sidewall, less than two-hundred micrometers.

12 Claims, 6 Drawing Sheets

(56) References Cited

U.S. PATENT DOCUMENTS

| | | |
|---|---|---|
| 9,229,280 B2 | 1/2016 | Fan |
| 2002/0071085 A1 | 6/2002 | Huang et al. |
| 2002/0085158 A1 | 7/2002 | Armagost et al. |
| 2006/0072063 A1* | 4/2006 | Kim ................. B82Y 20/00 349/156 |
| 2010/0328590 A1 | 12/2010 | Huang |
| 2013/0242243 A1* | 9/2013 | Supon ............... G02F 1/13452 349/122 |
| 2013/0242244 A1* | 9/2013 | Supon ............... G02F 1/1339 349/122 |
| 2013/0320557 A1 | 12/2013 | Lai |
| 2013/0333744 A1* | 12/2013 | Yokochi ............... H01B 1/22 136/244 |

OTHER PUBLICATIONS

Huang, et al., "Integrated Digital Input Driver for Active Matrix Liquid-Crystal-On-Silicon Display," Department of Electrical and Electronic Engineering, The Hong Kong University of Science of Technology, 1995.

Bleha, et al., "Advances in Liquid Crystal on Silicon (LCOS) Spatial Light Modulator Technology," Proc. of SPIE, vol. 8736, 2013.

Translation of Taiwanese Office Action corresponding to Taiwanese Patent Application No. 104137949, dated Jun. 27, 2016, 4 pages.

"Semiconductor manufacturing techniques for ferroelectric liquid crystal microdisplays," Laser Focus World http://www.laserfocusworld.com/articles/print/volume-36/issue-5/features/flat-panel-displays/semiconductor-manufacturing-techniques-for-ferroelectric-liquid-crystal-microdisplays.html.

* cited by examiner

PANEL CARRIER AND METHOD FOR ATTACHING A LIQUID-CRYSTAL-ON-SILICON PANEL THERETO

BACKGROUND

Liquid-crystal-on-silicon (LCoS) displays are used in consumer electronics, such as hand-held projectors and near-eye displays. FIG. 1 shows one exemplary use scenario for a prior art LCoS panel 200, wherein LCoS panel 200 is located on a PCB 102 incorporated into a near-eye display 130 attached to eyeglasses 120. LCoS panel 200 may alternately be employed in a different display device, such as in a hand-held image projector.

FIG. 2 is a perspective view of prior-art LCoS panel 200. LCoS panel 200 includes a cover glass 219 on a semiconductor wafer 214. A liquid crystal layer 217 is between cover glass 219 and semiconductor wafer 214. A pixel array 215 is between the liquid crystal layer 217 and semiconductor wafer 214. A corner portion of liquid crystal layer 217 is not shown to reveal pixel array 215 beneath it. Semiconductor wafer 214 has a bottom surface 214B and a top surface 214T. Top surface 214T includes a plurality of bond pads 287 that control each pixel of pixel array 215, as known in the art.

A transparent conductive layer 218 is on the surface of cover glass 219 adjacent to liquid crystal layer 217. For clarity of illustration, FIG. 2 shows only a portion of conductive layer 218 on overhang region 229 of cover glass 219. Dam 216 contains liquid crystal layer 217. Semiconductor wafer 214 is formed of silicon, for example. Transparent conductive layer 218 is deposited on cover glass 219, and is, for example, formed of indium titanium oxide (ITO). LCoS panel 200 has a panel width 222 and a panel depth 223.

FIG. 3 is a cross-sectional view of a prior-art mounted LCoS panel 300 that includes LCoS panel 200 electrically connected to a flexible printed circuit assembly (FPCA) 302. In FIG. 3, reference numerals between 200 and 300 denote parts of LCoS panel 200 introduced in FIG. 2. FPCA 302 includes a surface-mount connector (not shown) for mechanical and electrical connection to a printed circuit board. The portion of FPCA 302 shown in FIG. 2 is bonded to a rigid substrate 350, which is formed of metal, for example.

LCoS panel 200 is electrically connected to FPCA 302 via a plurality of wire bonds 383, conductive glue 386, and a soldering layer 388. Conductive glue 386 has a height 386H. Encapsulation glue 391 covers wire bonds 383. Soldering layer 388 and conductive glue 386 electrically connect transparent conductive layer 218 to a conductive pad 304 of FPCA 302, which is connected to a conductive pad trace 306 of FPCA 302. Each of a plurality of address electrodes 305 of FPCA 302 receives a signal from a respective one of a plurality of address electrode traces 303 of FPCA 302. Each wire bond 383 carries a signal from a respective address electrode 305 to a respective bond pad 287. Address electrodes 305, wire bonds 383, and bond pads 287 are arranged in respective one-dimensional arrays into the plane of FIG. 3 such that each address electrode 305 is substantially aligned with a respective bond pad 287.

SUMMARY OF THE INVENTION

The present invention address two suboptimal features of prior-art mounted LCoS panel 300. The first suboptimal feature is that encapsulation glue 391 provides only limited protection to wire bonds 383, such that wire bonds 383 remain vulnerable to damage. The second suboptimal feature arises from height 386H of conductive glue 386, which approximately 0.7 mm. The required amount of conductive glue 386 makes its per-volume cost a nontrivial issue and increases risk of conductivity failure between conductive pad 304 and soldering layer 388.

In one embodiment, a panel carrier for an LCoS panel is disclosed. The panel carrier includes a substrate, a die-attach region, a short sidewall, and a conductor. The substrate has a top substrate surface. The die-attach region is on the top substrate surface for supporting the LCoS panel. The short sidewall is on a first side of the die-attach region and has (i) a top sidewall surface at a first height above the top substrate surface exceeding 0.4 millimeters, and (ii) an aperture spanning the top sidewall surface and the top substrate surface. The conductor at least partially fills the aperture for electrically connecting to a conductive layer of the LCoS panel.

In another embodiment, a panel carrier for the LCoS panel is disclosed. The panel carrier includes the substrate, the die-attach region, a short sidewall, the conductor, and a plurality of bond-pad electrodes. The tall sidewall extends to a first height above the top substrate surface, exceeding one millimeter, for protecting electrical connections to the plurality of bond-pad electrodes, which are located between the tall sidewall and the die-attach region. The plurality of bond-pad electrodes is exposed on the top substrate surface and located between the die-attach region and the tall sidewall. Each bond-pad electrode corresponds to a respective one of the plurality of bond pads.

In another embodiment, a method for mechanically and electrically connecting an LCoS panel to a panel carrier having a short sidewall is disclosed. The method includes a step of electrically connecting a transparent conductive layer of the LCoS panel to a conductive material, within the short sidewall, with a conductive adhesive having a thickness, between the transparent conductive layer and the short sidewall, less than two-hundred micrometers.

DETAILED DESCRIPTION OF THE EMBODIMENTS

Figure 4:
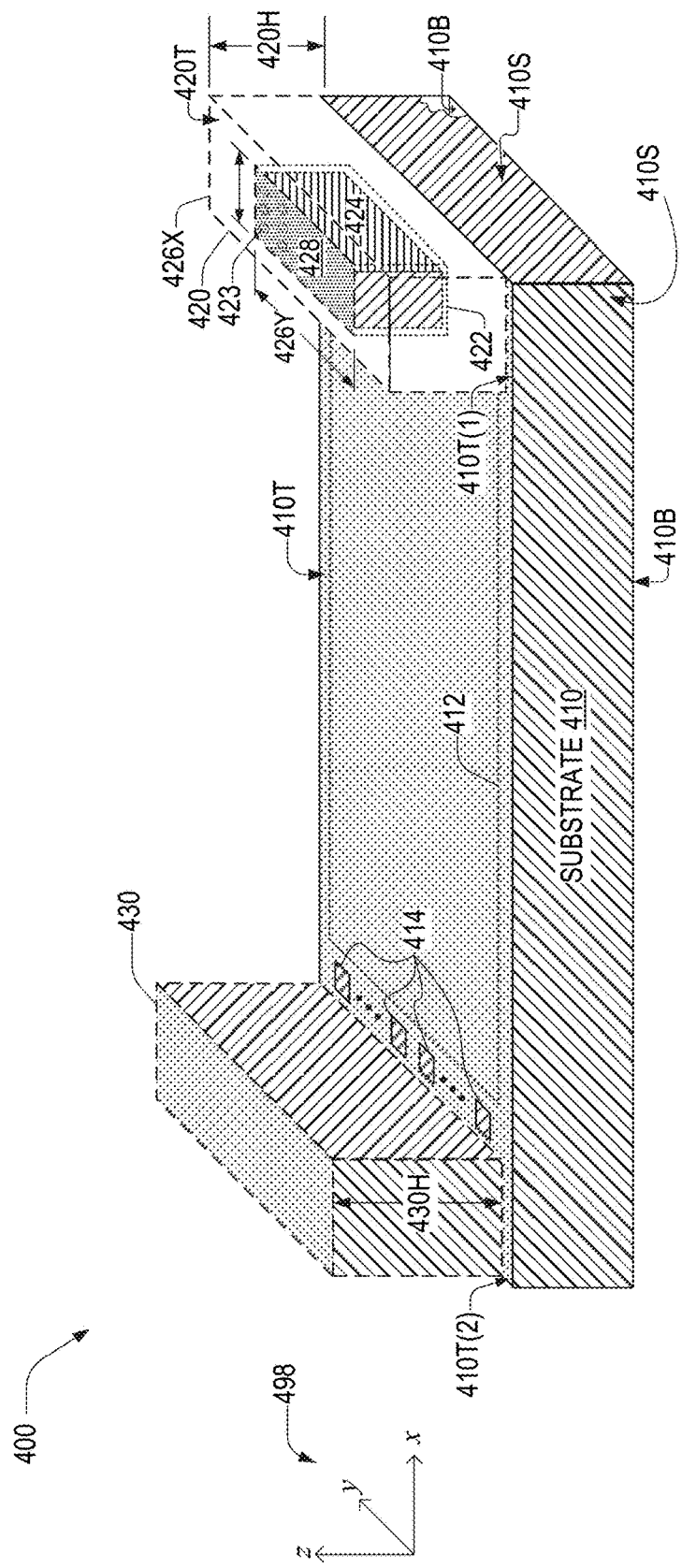
FIG. 4 is an isometric view of a panel carrier, in an embodiment.

FIG. 4 is an isometric view of a panel carrier 400. Panel carrier 400 includes a substrate 410 that has a top surface 410T opposite a bottom surface 410B. Both surfaces 410T and 410B are in respective planes parallel to the x-y plane of a coordinate system 498. Top surface 410T includes a first region 410T(1) and a second region 410T(2). Panel carrier 400 includes at least one of a short sidewall 420, on first region 410T(1), and a tall sidewall 430 on first region 410T(2). Panel carrier 400 includes both short sidewall 420 and tall sidewall 430 in the following description.

Top surface 410T that includes a plurality of bond-pad electrodes 414 formed thereon. Top surface 410T also includes a die-attach region 412 between bond-pad electrodes 414 and first region 410T(1).

Short sidewall 420 has a top surface 420T. Sidewall 420 and 430 has heights 420H, which is for example 0.6±0.2 mm. Surface 420T may be in a plane parallel to the x-y plane of coordinate system 498. Tall sidewall 430 has a height 430H, which is for example 1.5±0.2 mm.

Substrate 410 and at least one of sidewall 420 and sidewall 430 may be monolithic. Alternatively, substrate 410, sidewall 420, and sidewall 430 may be formed of respective pieces bonded together. Substrate 410 and sidewalls 420 and 430 are formed of a ceramic material such as aluminum oxide ($Al_2O_3$) or aluminum nitride (AlN). Ceramic materials have physical properties, such as thermal conductivity, thermal expansion coefficient and flexural strength, that make them appropriate for microelectronics packaging applications such as the panel carrier discussed herein.

Sidewall 420 has an aperture 422 extending between top surface 420T through a bottom surface of sidewall 420 opposite top surface 420T. Aperture 422 is at least partially filled with a conductor 424, which may be formed of aluminum, copper, tungsten, or other conductors suitable for electrical connection between layers. Conductor 424 may be electrically connected to a conductor having an exposed surface on substrate 410. For example, conductor 424 is electrically connected to a conductive pad on top surface 410T, which is electrically connected to a conductor exposed on at least one of bottom surface 410B and a side surface 410S of substrate 410. Sidewall 420 may also include a conductive pad 428 at least partially covering aperture 422 and electrically connected to conductor 424.

Substrate 410 may include an aperture between its surfaces 410T and 410B that is aligned with aperture 422. In such an embodiment, conductor 424 may extend through both sidewall 420 and substrate 410. When sidewall 420 and substrate 410 are monolithic, aperture 422 may extend through both sidewall 420 and substrate 410.

Aperture 422 occupies regions 426X and 426Y in sidewall 420. Instead of having a single aperture 422, sidewall 420 may include a plurality of apertures 423, within regions 426X and 426Y, each at least partially filled with a conductive material similar to conductor 424. Each aperture 423 has, for example, a diameter of at least one hundred micrometers. Conductive material in an aperture 423 may have thickness of 10±3 micrometers.

Figure 5:
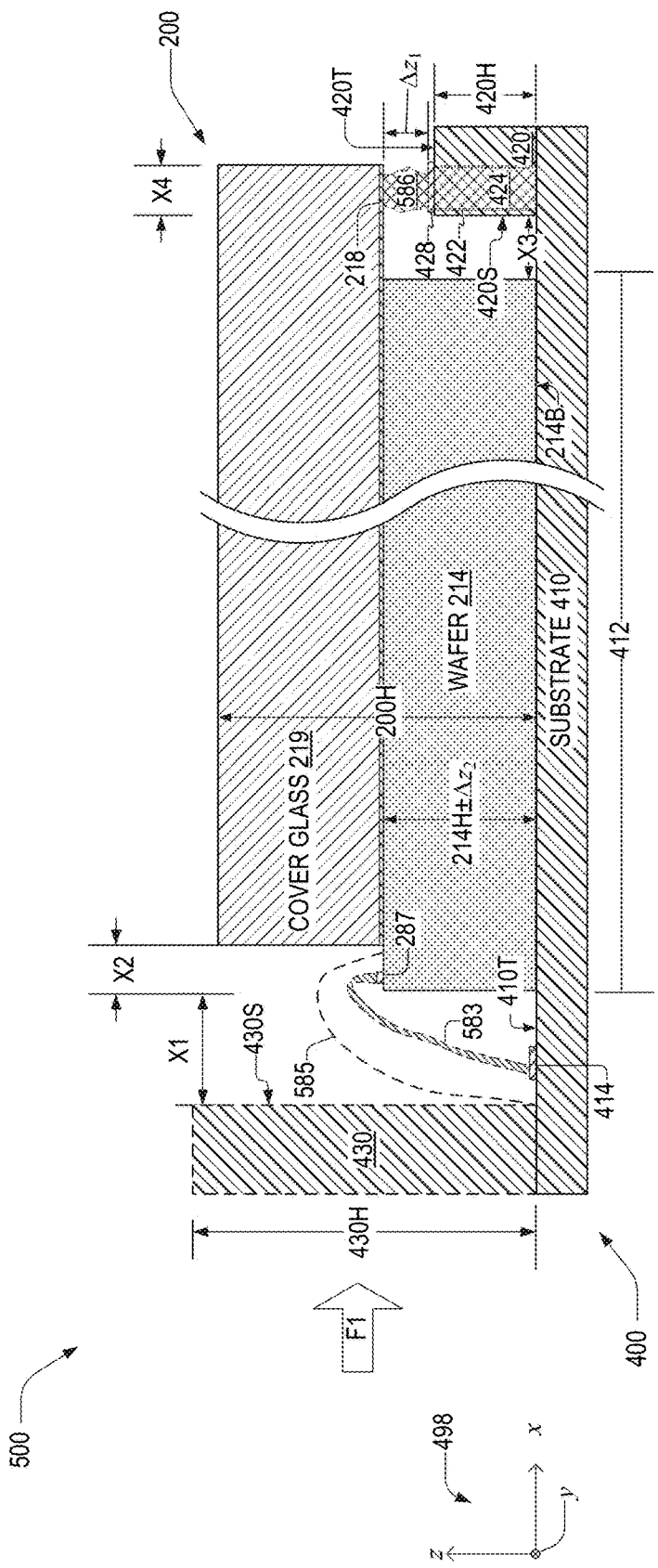
FIG. 5 is a cross-sectional view of panel carrier of FIG. 4 with the LCoS panel of FIG. 2 therein, in an embodiment.

FIG. 5 is a cross-sectional view of panel carrier 400 with LCoS panel 200 therein, which together form an LCoS device 500. The cross-sectional view of FIG. 5 is parallel to the x-z plane of coordinate system 498. Wafer 214 of LCoS panel 200 is disposed on die-attach region 412, which may include a die-attach film between surfaces 410T and 214B. Sidewalls 420 and 430 have respective inner surfaces 420S and 430S. LCoS device 500 may include bonding wires 583 the electrically connect each bond-pad electrode 414 to a respective bond pad 287.

Conductive layer 218 and conductive pad 428 are separated by a distance $\Delta z_1$. The top surface of conductive pad 428 may be flush with top surface 420T. Absent conductive pad 428, distance $\Delta z_1$ is the distance between conductive layer 217 and top surface 420T. LCoS device 500 may also include conductive adhesive 586 spanning distance $\Delta z_1$ between conductive layer 218 and conductive pad 428. Conductive adhesive 586 is for example conductive glue. Wafer 214 has a nominal height 214H, which has a tolerance $\Delta z_2$. Height 214H is for example 0.775 millimeters, and tolerance $\Delta z_2$ is for example 0.1 millimeters. Height 420H is less than height 214H by at least $\Delta z_2$, such that distance $\Delta z_1$ is positive to accommodate conductive adhesive 586. For example, 100 μm≤$\Delta z_1$≤200 μm, which accommodates a sufficient thickness of conductive adhesive 586 for proper functionality while limiting cost of the conductive adhesive compared to prior-art mounted LCoS panel 300.

Sidewall 430 protects bonding wires 583, for example, from incidental contact with an object that, absent sidewall 430, would exerting a force F1 on one or more bonding wires 583. In the embodiment of FIG. 5, height 430H of tall sidewall 430 exceeds a height 200H of LCoS panel 200, which provides additional protection to bonding wires 583. LCoS device 500 may also include encapsulation glue 585 on bonding wires 583.

FIG. 5 denotes horizontal distances X1, X2, X3, and X4. Distances X1 and X2 may be at least 1.4 mm 0.8 mm, respectively, to accommodate bonding wire 583, bond-pad electrode 414, and to enable associated wire bonding processes. In an embodiment, distance X1 is approximately a minimum allowable distance that accommodates bonding wire 583, bond-pad electrode 414, and to enable associated wire bonding processes. For example, distance X1=1.5±0.1 mm. Sidewall 430 and its distance X1 from wafer 214 at least partially obviates the need for encapsulation glue 585.

Distance X3 may be at least 0.1 mm, which corresponds to the typical accuracy of a pick-and-place process for placing LCoS panel 200 on panel carrier 400. Distance X4 may be at least 0.8 mm, which enables adequate electrical connection of conductive layer 218 to conductive pad 428 via conductive adhesive 586.

Figure 6:
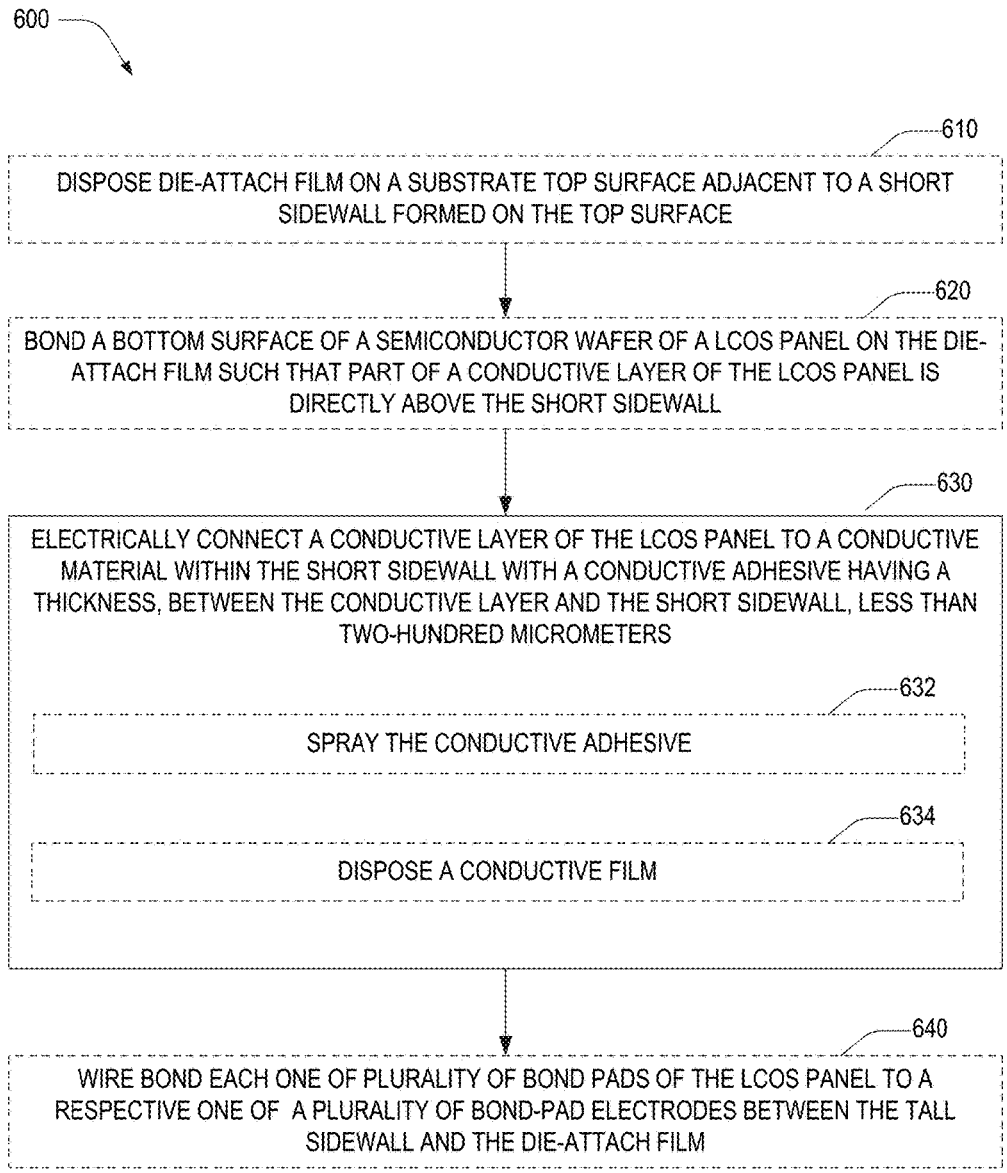
FIG. 6 is a flowchart illustrating a method for mechanically and electrically connecting an LCoS panel to a panel carrier, in an embodiment.

FIG. 6 is a flowchart illustrating a method 600 for mechanically and electrically connecting an LCoS panel to a panel carrier having a short sidewall. Step 610 is optional. In step 610, method 600 disposes die-attach film on a top substrate surface adjacent to a short sidewall formed on the top surface. In an example of step 610, a die-attach film is disposed on die-attach region 412 of panel carrier 400.

Step 620 is optional. In step 620, method 600 bonds a bottom surface of a semiconductor wafer of an LCoS panel on the die-attach film such that part of a conductive layer of the LCoS panel is directly above the short sidewall. In an example of step 620, bottom surface 214B is bonded to a die-attach film on surface 410T of substrate 410.

In step 630, method 600 electrically connects a conductive layer of the LCoS panel to a conductive material within the short sidewall with a conductive adhesive having a thickness, between the conductive layer and the short sidewall, less than two-hundred micrometers. In an example of step 630, conductive layer 218 of LCoS panel 200 is electrically connected to conductor 424 within short sidewall 420 with conductive adhesive 586.

Step 630 may include step 632, in which method 600 sprays the conductive adhesive on at least one of a top surface of the short sidewall and a surface of the conductive layer facing the short sidewall. In an example of step 632, conductive adhesive 586 is sprayed on top surface 420T of short sidewall 420.

Step 630 may include step 634, in which the conductive adhesive is a conductive film, such as an anisotropic conductive film. In step 634, method 600 disposes the conductive film on at least one of a top surface of the short sidewall and a surface of the conductive layer facing the short sidewall. In an example of step 632, conductive adhesive 586 is a conductive film disposed as a thin film on top surface 420T of short sidewall 420.

Figure 1:
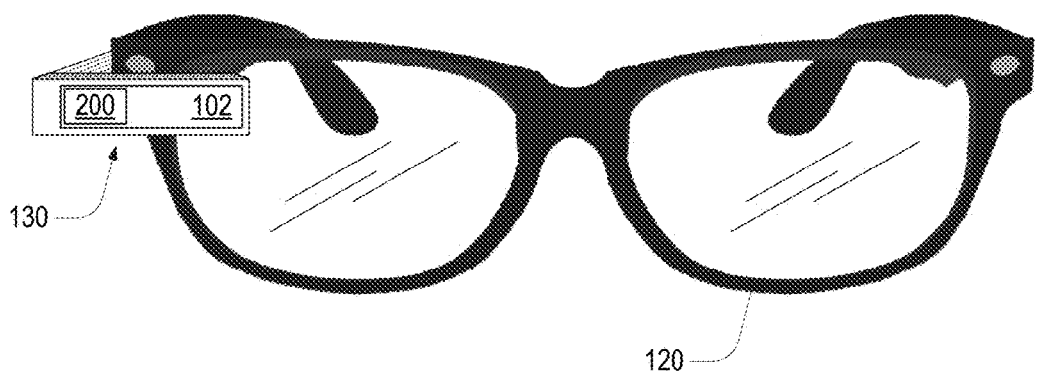
FIG. 1 shows a prior art LCoS panel on a printed circuit board (PCB) incorporated into a near-eye display attached to a pair of eyeglasses.
Figure 2:
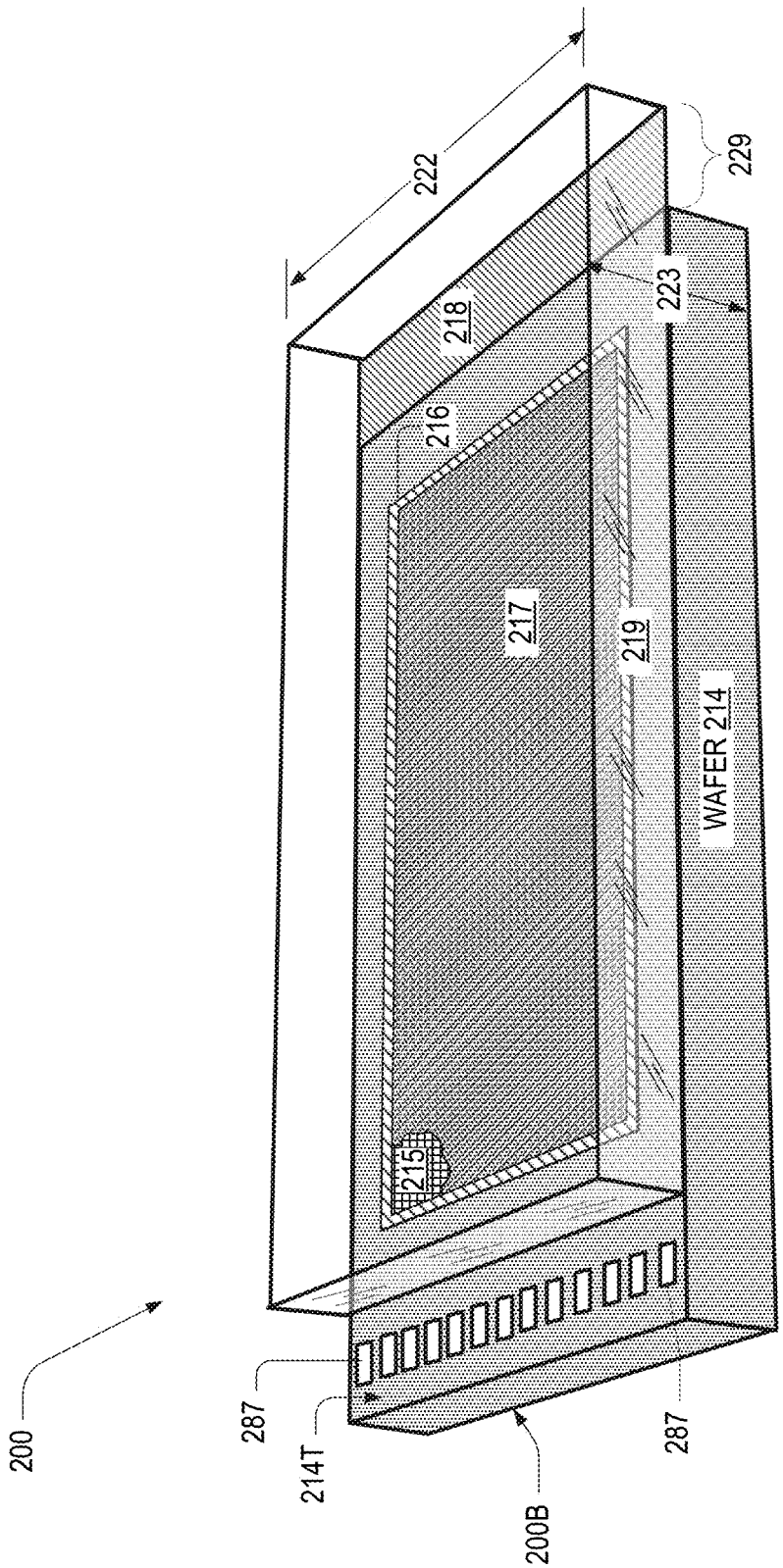
FIG. 2 is a perspective view of the prior-art LCoS panel of FIG. 1.
Figure 3:
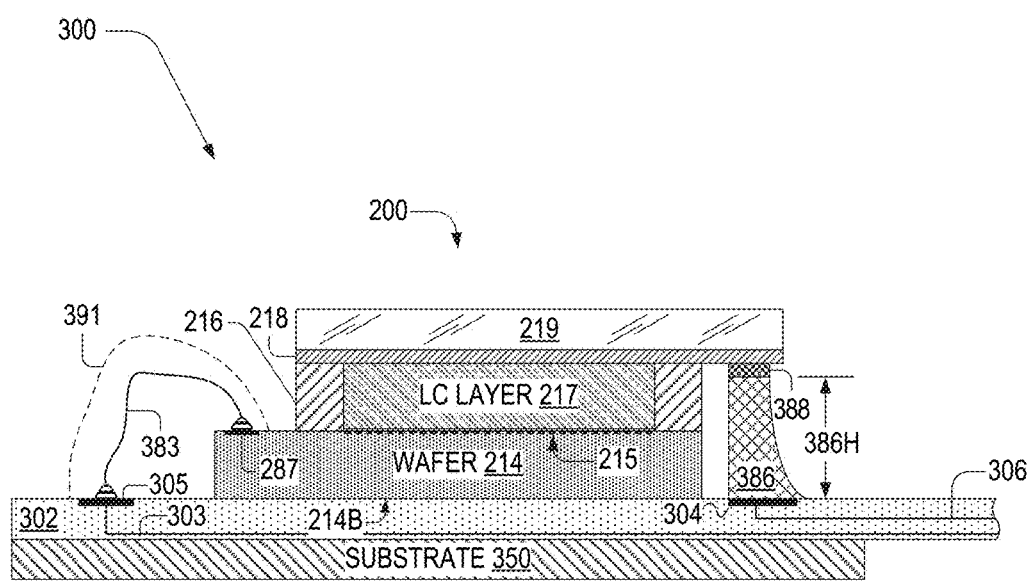
FIG. 3 is a cross-sectional view of a prior-art LCoS panel module.

Step 640 is optional, and may be performed when the substrate includes a tall sidewall opposite the short sidewall. In step 640, method 600 wire bonds each one of plurality of bond pads of the LCoS panel to a respective one of a plurality of bond-pad electrodes between the tall sidewall and the die-attach film. In an example of step 640, each bond pad 287 (FIGS. 2, 5) is wire bonded to a respective bond-pad electrode 414 (FIGS. 4, 5).

Combinations of Features.

Features described above as well as those claimed below may be combined in various ways without departing from the scope hereof. The following examples illustrate some possible, non-limiting combinations:

(A1) A panel carrier includes a substrate, a die-attach region, a short sidewall, and a conductor. The substrate has a top substrate surface. The die-attach region is on the top substrate surface for supporting the LCoS panel. The short sidewall is on a first side of the die-attach region and has (i) a top sidewall surface at a first height above the top substrate surface exceeding 0.4 millimeters, and (ii) an aperture spanning the top sidewall surface and the top substrate surface. The conductor at least partially fills the aperture for electrically connecting to a conductive layer of the LCoS panel.

(A2) The panel carrier denoted by (A1), in which the LCoS panel has semiconductor wafer with a plurality of bond pads thereon, may further include a plurality of bond-pad electrodes and a tall sidewall. The plurality of bond-pad electrodes are exposed on the top substrate surface, on a side of the die-attach region opposite the short sidewall. Each bond-pad electrode corresponds to a respective one of the plurality of bond pads. The tall sidewall extends to a second height, above the top substrate surface, exceeding the first height, for protecting electrical connections to the plurality of bond-pad electrodes, which are located between the tall sidewall and the die-attach region. The die-attach region is between the tall sidewall and the short sidewall.

(A3) In the panel carrier denoted by (A2), a distance between the tall sidewall and the plurality of bond-pad electrodes may be less than 1.6 millimeters.

(A4) Any panel carrier denoted by one of (A2) and (A3) may further include the LCoS panel, a semiconductor wafer thereof being disposed on the die-attach region. The first height is less than a thickness of the semiconductor wafer, and the second height exceeds a total thickness of the LCoS panel.

(A5) In any panel carrier denoted by one of (A2) through (A4), the second height may be at least 1.5 millimeters such that it exceeds a total thickness of the LCoS panel.

(A6) Any panel carrier denoted by one of (A2) through (A5) may further include, on the top sidewall surface, a conductive pad electrically connected to the conductor.

(A7) In any panel carrier denoted by one of (A1) through (A6), the first height may be less than 0.8 millimeters such that it is less than a thickness of a semiconductor wafer of the LCoS panel.

(B1) A panel carrier for an LCoS panel is disclosed. The LCoS panel has the LCoS panel includes a semiconductor wafer with a plurality of bond pads thereon. The panel carrier includes a substrate, a die-attach region, a tall sidewall, the conductor, and a plurality of bond-pad electrodes. The substrate has a top substrate surface. The die-attach region is on the top substrate surface for supporting the LCoS panel. The tall sidewall extends to a first height above the top substrate surface, exceeding one millimeter, for protecting electrical connections to the plurality of bond-pad electrodes, which are located between the tall sidewall and the die-attach region. The plurality of bond-pad electrodes is exposed on the top substrate surface and located between the die-attach region and the tall sidewall. Each bond-pad electrode corresponds to a respective one of the plurality of bond pads.

(B2) The panel carrier denoted by (B1) may further include a short sidewall and a conductor. The short sidewall has (i) a top sidewall surface at a second height above the top substrate surface exceeding 0.4 millimeters, and (ii) an aperture spanning the top sidewall surface and the top substrate surface. The conductor at least partially fills the aperture for electrically connecting to a conductive layer of the LCoS panel. The die-attach region is between the tall sidewall and the short sidewall.

(B3) The panel carrier denoted by (B2) may further include, on the top sidewall surface, a conductive pad electrically connected to the conductor.

(B4) In any panel carrier denoted by one of (B2) and (B3), the second height may be less than 0.8 millimeters such that it is less than a thickness of the semiconductor wafer.

(B5) In any panel carrier denoted by one of (B1) through (B4), the first height may be at least 1.5 millimeters such that it exceeds a total thickness of the LCoS panel.

(B6) In any panel carrier denoted by one of (B1) through (B5), a distance between the tall sidewall and the plurality of bond-pad electrodes may be less than 1.6 millimeters.

(B7) Any panel carrier denoted by one of (B1) through (B6) may further include the LCoS panel, the semiconductor wafer being disposed on the die-attach region, the first height exceeding a total thickness of the LCoS panel.

(C1) A method for mechanically and electrically connecting a LCoS panel to a panel carrier having a short sidewall includes a step of electrically connecting a transparent conductive layer of the LCoS panel to a conductive material, within the short sidewall, with a conductive adhesive having a thickness less than two-hundred micrometers. The thickness is between the transparent conductive layer and the short sidewall.

(C2) In the method denoted by (C1), the step of electrically connecting may include spraying the conductive adhesive on at least one of a top surface of the short sidewall and a surface of the transparent conductive layer facing the short sidewall.

(C3) In any method denoted by one of (C1) and (C2), the step of electrically connecting may include disposing the conductive film on at least one of a top surface of the short sidewall and a surface of the transparent conductive layer facing the short sidewall.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A panel carrier for a liquid-crystal-on-silicon (LCoS) panel comprising:
   a substrate having a top substrate surface;
   a die-attach region on the top substrate surface for supporting the LCoS panel;

a first sidewall, on a first side of the die-attach region, having (i) a top sidewall surface at a first height above the top substrate surface exceeding 0.4 millimeters, and (ii) an aperture spanning the top sidewall surface and the top substrate surface; and a conductor at least partially filling the aperture for electrically connecting to a conductive layer of the LCoS panel.

2. The panel carrier of claim 1, the LCoS panel having semiconductor wafer with a plurality of bond pads thereon, further comprising:

a plurality of bond-pad electrodes exposed on the top substrate surface, on a side of the die-attach region opposite the first sidewall, each bond-pad electrode corresponding to a respective one of the plurality of bond pads;

a second sidewall extending to a second height, above the top substrate surface, exceeding the first height, for protecting electrical connections to the plurality of bond-pad electrodes, which are located between the second sidewall and the die-attach region, the die-attach region being between the second sidewall and the first sidewall.

3. The panel carrier of claim 2, a distance between the second sidewall and the plurality of bond-pad electrodes being less than 1.6 millimeters.

4. The panel carrier of claim 2, further comprising the LCoS panel, a semiconductor wafer thereof being disposed on the die-attach region, the first height being less than a thickness of the semiconductor wafer, and the second height exceeding a total thickness of the LCoS panel.

5. The panel carrier of claim 2, the second height being at least 1.5 millimeters such that it exceeds a total thickness of the LCoS panel.

6. The panel carrier of claim 1, further comprising, on the top sidewall surface, a conductive pad electrically connected to the conductor.

7. The panel carrier of claim 1, the first height being less than 0.8 millimeters such that it is less than a thickness of a semiconductor wafer of the LCoS panel.

8. The panel carrier of claim 1, the first sidewall being formed entirely of a ceramic material.

9. A method for mechanically and electrically connecting a liquid-crystal-on-silicon (LCoS) panel to a panel carrier, the method comprising: electrically connecting a transparent conductive layer of the LCoS panel to a conductive material, within an aperture through a first sidewall of the LCoS panel carrier, with a conductive adhesive having a thickness, between the transparent conductive layer and the first sidewall, less than two-hundred micrometers.

10. The method of claim 9, the step of electrically connecting comprising:

spraying the conductive adhesive on at least one of a top surface of the first sidewall and a surface of the transparent conductive layer facing the first sidewall.

11. The method of claim 9, the conductive adhesive being a conductive film, the step of electrically connecting comprising:

disposing the conductive film on at least one of a top surface of the first sidewall and a surface of the transparent conductive layer facing the first sidewall.

12. The method of claim 9, the first sidewall being formed entirely of a ceramic material.

* * * * *